United States Patent [19]

Buelna et al.

[11] Patent Number: 5,206,206

[45] Date of Patent: Apr. 27, 1993

[54] METHOD OF PRE-TREATING PEAT FOR USE IN BIOFILTERS FOR WASTEWATER TREATMENT AND USE THEREOF

[75] Inventors: Gérardo Buelna, Duberger; Ginette Bélanger, Rivière-du-Loup, both of Canada

[73] Assignee: Les Tourbieres Premier Ltée, Quebec, Canada

[21] Appl. No.: 736,525

[22] Filed: Jul. 26, 1991

[30] Foreign Application Priority Data

Jul. 27, 1990 [CA] Canada .................................. 2022097

[51] Int. Cl.$^5$ ............................................ B01J 20/24
[52] U.S. Cl. ..................................... 502/404; 502/401
[58] Field of Search ................................. 502/404, 401

[56] References Cited

U.S. PATENT DOCUMENTS

| | | | |
|---|---|---|---|
| 4,144,190 | 3/1979 | Bowes et al. | 502/404 X |
| 4,662,900 | 5/1987 | Ottengraf | 55/90 |
| 4,676,907 | 6/1987 | Harrison | 502/437 X |
| 4,721,585 | 1/1988 | Melchiorri Santolini et al. | 210/616 |
| 4,829,045 | 5/1989 | Fransham | 502/401 |

FOREIGN PATENT DOCUMENTS

| | | |
|---|---|---|
| 956921 | 10/1974 | Canada . |
| 1014281 | 7/1977 | Canada . |
| 1190673 | 7/1985 | Canada . |
| 2604990 | 4/1988 | France . |

OTHER PUBLICATIONS

Peat and Peatlands—Gerardo Buelna et al—"Peat-Based Bio-Filters for Municipal Wastewater Treatment: Choice of Peat", Aug. 1989.
J. L. Brown et al.—"Use of Peat for Wastewater Filtration—Principles and Methods".
J. Environ Qual., vol. 11, No. 1, 1982—Dale S. Nichols et al. "Treatment of Secondary Sewage Effluent with a Peat-Sand . . . ", 1982.
12e Symposium international sur le traitement des eaux usées—Gerardo Buelna et al—"Performance Epuration d'Un Biofiltre . . . ", Nov. 1989.
J. Environ. Qual., vol. 13, No. 4, 1984—J. L. Brooks et al—"Use of Peat for On-Site Wastewater Treatment".
Bernard Coupal "La Tourbe: un agent dépolluant".
M. E. Leslie—Aug. 1974—"Peat: New Medium for Treating Dye House Effluent".
Serrener Consultation Inc.—Apr. 1989—Subba Narasiah et al. "Le Systeme de Filtration Mediaflex", Apr. 1989.
F. Meunier et al—"Utilisation de la Tourbe pour le Traitement des Eaux Usees".
"Peat-Based Biofiltration System for On-Site Wastewater Treatment" 1991 Annual Conference and Exhibit on Water Pollution Control Jan. 27-30, 1991—Marriott Copley Place, Boston Mass.
"Biofiltration a Base de Tourbe pour le Traitement des Eaux Usees de Petites Municipalites" Gérardo Buelna et al. Sciences et Techniques de l'eau—Aug. 1990.
"Biofiltration a Base de Tourbe: une Alternative Prometteuse pour l'Assainissement Individuel"—Ginette Belanger et al—13e Symposium sur le traitement des eaux usées—Montréal, Nov. 14-16, 1990.

*Primary Examiner*—Patrick P. Garvin
*Attorney, Agent, or Firm*—McGlew and Tuttle

[57] ABSTRACT

A method of physical and chemical pre-treatment of peat to be used in biofilters for wastewater treatment is disclosed. Particularly, the invention relates to a mixture of peat which has been pre-seeved and then mixed with pre-determined concentrations of a Fe-containing compound and lime. Biofilters which utilizes this peat mixture useful for wastewater treatment are also disclosed.

17 Claims, 1 Drawing Sheet

METHOD OF PRE-TREATING PEAT FOR USE IN BIOFILTERS FOR WASTEWATER TREATMENT AND USE THEREOF

BACKGROUND OF THE INVENTION.

a) FIELD OF THE INVENTION

The present invention relates to a method of physical and chemical pre-treatments of peat to be used in biofilters for wastewater treatment. These peat-based biofilters are suitable for domestic, industrial or urban applications. More particularly, the invention relates to a mixture of peat which has been pre-treated physically and then mixed with pre-determined concentrations of a) a Fe-containing compound, and b) lime. Also, this invention relates to a biofilter which utilises this pre-seived peat mixture for wastewater treatment.

b) BRIEF DESCRIPTION OF THE PRIOR ART

In recent years, there has been increasing interest in the incorporation of peat into wastewater treatment systems. Peat removes pollutants and microbial activity from wastewaters by adsorption and absorption reactions (Tihn et al., 1971, Can. Min. Metall. Bull, Vol, 64, pp.99-104). Peat has been demonstrated to be effective in the removal of suspended solids, macronutrients (nitrogen and phosphorus), heavy metals, trace organics, and fecal coliforms in a variety of situations. Case studies reported include the application of peat to treat domestic and industrial wastewater in both natural peatlands and constructed peat systems (Sarakka and Kamppi, 1971, Suo, Vol. 22, pp.51-58; Coupal and Lalancette, 1976, Water res., Vol. 10. pp.1071-1076; Gustenpergen, 1980, Can. J. of Chem. Eng, Vol 58, pp.235-240; Dubuc et al., 1986, Water Res. Bull., Vol. 22, pp.297-303).

Because of its low cost, coupled with is natural characteristics of absorption and adsorption, and its capacity to provide a favorable environment for microorganisms, peat offers great potential for the biological filtration of wastewater. Indeed, although several investigations have shown that peat is an effective medium for use in water pollution control, studies on treatment capacity of different types of peat are still very limited. A problem often met is the color-leaching of peat resulting in a yellow-brown color of water (Rock et al., 1984, J. Environ. Qual., Vol. 13, pp.518-523). Although leaching decreases with time (Rock et al., supra; Rana and Viraraghavan, 1987, Water Poll. Res. J. Canada, Vol.22, pp.491-504), colored discharges may affect the aesthetics of the effluent of the system.

Moreover, in some biofiltration systems internal clogging happens after a few days of operation (Buelna et al., 1989, Peat and Peatlands, Diversification and Innovations, Symposium of International scope on 8 themes of future applications of peat; August 6-10, Québec City, Canada). The clogging is caused by small particles present in the peat bed which are found in the peat in amounts proportional to the humification degree of the peat. As a direct result of internal clogging problems, the hydraulic charge that may be applied daily to such a system is greatly restricted (0.04 to 0.2 m/day) (Brooks et al., 1984, J. Environ. Qual., Vol.13,(4), pp.524-530), therefore, diminishing the efficiency of such biofilters to very limited applications.

Also, consistent and efficient elimination of the phosphorus has not been achieved to date. Farnham and Brown (supra) have disclosed a system in which 99% of the total P was eliminated. However, these results were obtained with a system performing with hydraulic charges ranging from 0.1 to 0.2 m/day. These charges could hardly suffice to handle the demands of small municipalities or even domestic systems.

Still, in this respect Nichols and Boelter (1982, J. Env. Qual., Vol.11 (1), pp.86-92) disclosed a peat-sand filter bed which removes phosphorus in an efficient manner. However, these results were unreproducible after repeated efforts from other investigators.

OBJECTS OF THE INVENTION

One object of the present invention is to provide a method of physical pre-treatment for any type of peat to be used in biofilters for wastewater treatment, such that the treated peat is now homogeneous, and may be standardized.

Another object of the present invention is to provide a method of chemical pre-treatment for peat to be used in biofilters for wastewater treatment, such that the resulting peat eliminates phosphorus in a very efficient manner.

Another object of this invention is to provide a mixture comprising iron and lime which can serve as filtering matter for a biofilter.

Another object of the invention is to provide a peat-based biofilter which has no color-leaching problems.

A further object of the invention is to provide a peat-based biofilter with no internal clogging problems.

Still, a further object of the invention is to provide a peat-based biofilter having an overall high filtering efficiency that can withstand high hydraulic charges and may be used for domestic, urban, and industrial wastewater treatment applications.

SUMMARY OF THE INVENTION

In accordance with this invention, these objects are first achieved with a method for pretreating peat to be used in peat-based biofilters for wastewater treatment, this method comprising:
a) pre-seiving the peat,
b) mixing the pre-seeved peat with a predetermined concentration of $CaCO_3$ or equivalents thereof, and a pre-determined concentration of a Fe-containing compound or equivalents thereof.

Also, the present invention provides a mixture of peat for use in a biofilter for wastewater treatment, the peat comprising large, intermediary, and small fibers, the mixture comprising:
a) peat which has previously been sieved through sieving means to recover only the intermediary fibers; and
b) pre-determined concentrations of $CaCO_3$ or equivalents thereof, and
c) pre-determined concentration of a Fe-containing compound or equivalents thereof.

Furthermore, the present invention provides a biofilter which utilises this peat-mixture as a filtering media.

The present invention therefore provides a peat-based biofilter in which particles of unwanted sizes have been eliminated, thereby avoiding unwanted internal clogging problems. Also, such a peat-based biofilter withstands much higher flow-rates and hydraulic charges than conventional ones. The mixture of pre-sieved with iron-containing compound and lime, when used in a biofilter, allows efficient elimination of total phosphorus and color in the effluent water from day 1 of the treatment.

Figure 1:
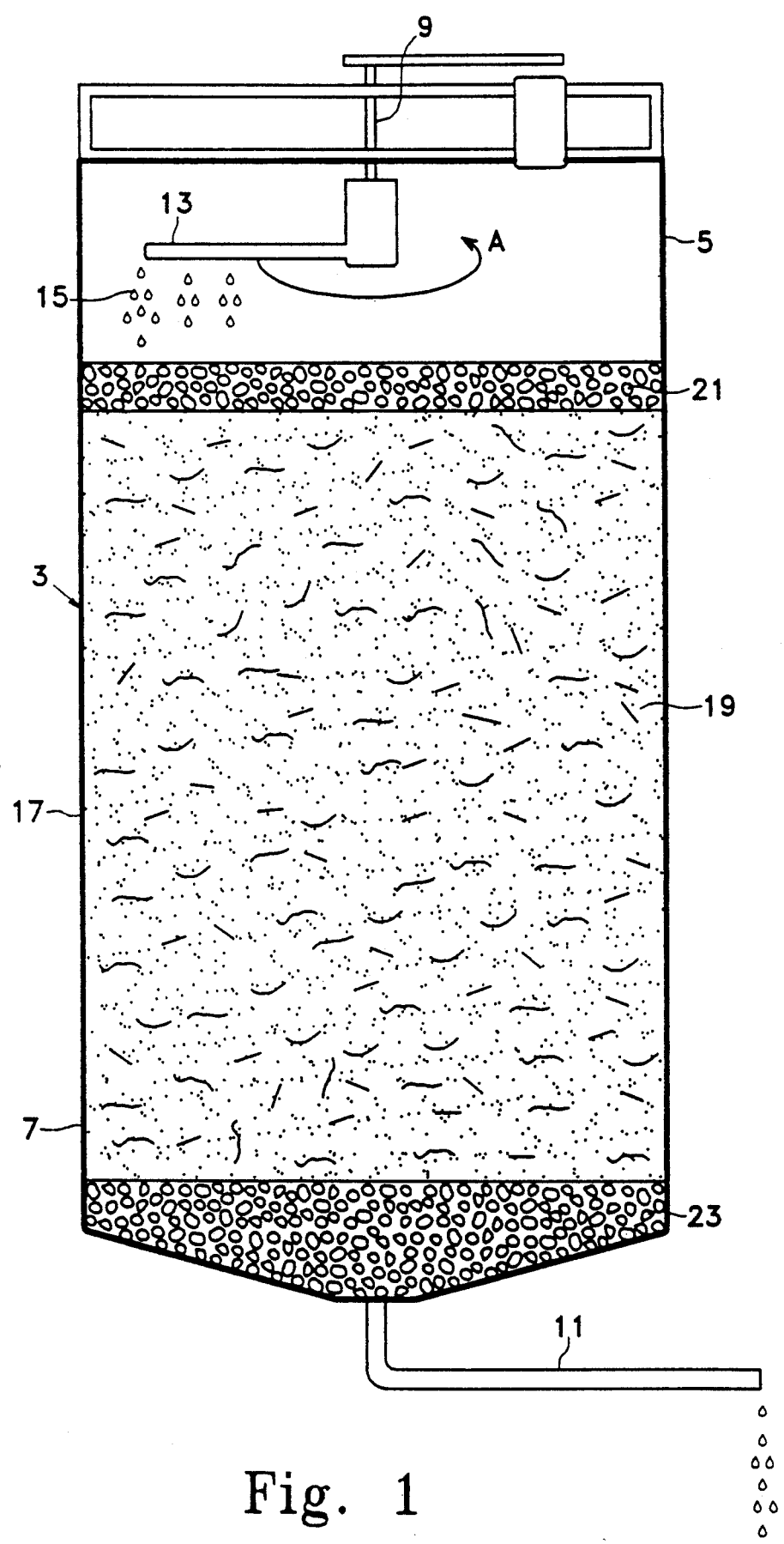
FIG. 1 represents a schematic cross-section of the side view of a biofilter according to one embodiment of the present invention.

DETAILED DESCRIPTION OF PREFERRED EMBODIMENTS OF THE INVENTION.

The method of pre-treating peat for use in biofilters for wastewater treatment according to the invention comprises a preliminary step consisting of physically separating the peat fibers according to their size. Indeed, natural peat contains various fibers and particles ranging in size from large roots to intermediate fibers to small particles. Following this first step, the size of the peat fibers is homogenized such that the biggest and smallest particles present, such as the roots and the dust, are eliminated. The remaining fibers are herein referred to as the intermediary fibers.

The more a peat is humified, the more it possesses small particles (or dust) which may cause internal clogging of the peat bed. Thus, the method according to the invention comprises a preliminary treatment wherein peat is sieved through sieving means to eliminate such particles and recover only the intermediary fibers. This sieving can be made in two steps. In a first step, the peat is conveyed on a belt conveyor, the conveyor belt, constituting a first grid, is punctured with apertures of approximately ¾th of an inch in diameter. After passing through this first grid, the passed-through peat will be free of roots and other larger particles.

After this first step, the peat is again sieved through a belt-conveyor being punctured with apertures of approximately 3/16th of an inch diameter, thus constituting a second grid. This second sieving step will eliminate the smallest particles such as dust, etc. and only the intermediate fibers will be left on the conveyor belt. The apparent density of the peat after this sieving procedure is comparable to its initial density (between 0.06 and 0.08 $g/cm^3$).

Any kind of peat may be physically treated in such a manner. Of course, it will be understood that a highly humified peat will give lower recovery of intermediary-size fibers, since most of its weight will be eliminated as dust and small particles. Thus, it may be preferable to use as starting material a peat having a Von Post index ranging from 3 to 6.

Of course, it will understood that the belt conveyor used herein as a sieving means may be replaced by any other suitable grid which may perform efficiently with such a fibrous material and which may handle large loads as is required for industrial scale treatment.

After this preliminary sieving treatment, the peat may be used as is, to fill a filter bed for use in wastewater treatment. These intermediary fibers being devoid of small particles, the biofilter will not have any clogging problems as is described in similar conventional systems.

Shown in FIG. 1 is one particular embodiment of this invention which comprises a conventional filtration-column which has been filled with a bed of this pre-sieved peat. There is schematically illustrated one column 3 having a top 5 and a bottom 7. Influent means 9 are connected to the top of the column 5 whereas the effluent means 11 are connected to the bottom 7 such that the water may be filtered by gravity. The influent means 9 comprise a rotary distribution system 13 which rotates 360 degrees around line A to facilitate the distribution of the influent water 15 on top of the column 5. The filter-bed 17 is constituted of a layer of peat 19 disposed between two layers of calcareous stones, an upper layer 21 and a bottom layer 23. For the upper layer 21: approximately 5 cm of calcareous stone are added on top of the peat bed 17 to improve wastewater distribution through the peat bed 17. As a second purpose, the upper layer of stones 21 constitutes a way to avoid clogging on the superficial layer of the peat bed. Indeed, when the influent water has not been pre-treated, the particles contained in the water may cause superficial clogging of the peat bed. These particles will be retained by the upper layer of stones 21 and will not attain the peat bed 17. This upper layer of stone 21 may be easily washed separately from the peat bed 17 and reutilized after washing. Each peat bed is supported by a bottom layer 23 of calcareous stone (approximately 9-11 cm).

In addition, other ways to eliminate the unwanted particulate matter present in the water before its contact with the upper layer of stones may be added to the system, such as a pre-treatment unit (sceptic tank, lagoon, ponds, etc.).

EXAMPLE 1

According to one aspect of the invention, six columns as the one presented in FIG. 1 were connected to common influent means which collected wastewater from a sample population of a small urban municipality. The peat depth was 0.8 m, giving a volume of peat of approximately 0.5 $m^3$. The water was first passed through a 3 mm grid, then distributed to each of the columns by pumps and a rotatary distribution system on top of the filter beds. This biofilter was working 24 hours a day for a total period of over 1 year. During this period, different hydraulic charges were assessed, namely: 0.3, 0.6, and 1.3 m/day.

Influent and effluent water samples were collected, generally three times a week, and analysed in accordance with standard methods (APHA, 1985) for the pH, color, total suspended solids (TSS), 5-days biological oxygen demand ($BOD_5$), chemical oxygen demand (COD), total Kjeldahl nitrogen (NTK-N), total phosphorus (P) and fecal coliforms.

Table 1 shows a summary of treatment efficiency for one type of peat having a Von Post index of 4 which has been pre-sieved according to the invention before packing of the columns. The original and post-treatment density of the peat was 0.08 $g/cm_3$.

TABLE 1

| Parameters | Hydraulic charges | Influent | Effluent |
| --- | --- | --- | --- |
| pH | 0.3 | 7.6 | 6.8 |
|  | 0.6 | 7.4 | 6.6 |
|  | 1.3 | 8.0 | 6.8 |
| Color (ucv) | 0.3 | 22 | 44 |
|  | 0.6 | 33 | 30 |
|  | 1.3 | 28 | 36 |
| Turbidity (NTU) | 0.3 | 48 | 1 |
|  | 0.6 | 60 | 1 |
|  | 1.3 | 63 | 1 |
| Alcalinity (mg $CaCO_3$/L) | 0.3 | 120 | 105 |
|  | 0.6 | 114 | 92 |
|  | 1.3 | 150 | 119 |
| Dissolved oxygen (mg/L) | 0.3 | 9.1 | 8.1 |
|  | 0.6 | 4.6 | 5.6 |
|  | 1.3 | 6.6 | 3.5 |
| TSS (mg/L) | 0.3 | 253 | 1 |
|  | 0.6 | 81 | 1 |
|  | 1.3 | 109 | 2 |

TABLE 1-continued

| Parameters | Hydraulic charges | Influent | Effluent |
| --- | --- | --- | --- |
| $BOD_5$ (mg/L) | 0.3 | 74 | <5 |
| | 0.6 | 59 | <5 |
| | 1.3 | 77 | <5 |
| total COD (mg/L) | 0.3 | 337 | 25 |
| | 0.6 | 180 | 16 |
| | 1.3 | 201 | 22 |
| $NH_3$ (mg N/L) | 0.3 | 7.9 | 0.3 |
| | 0.6 | 8.4 | 0.4 |
| | 1.3 | 11.7 | 5.5 |
| nitrate-nitrate (mg N/L) | 0.3 | 2.6 | 6.0 |
| | 0.6 | 1.9 | 3.3 |
| | 1.3 | 1.0 | 9.3 |
| NTK-N (mg N/L) | 0.3 | 21.1 | 1.7 |
| | 0.6 | 16.5 | 1.3 |
| | 1.3 | 23.2 | 6.9 |
| Phosphorus (mg P/L) | 0.3 | 5.1 | 2.0 |
| | 0.6 | 2.8 | 1.9 |
| | 1.3 | 4.4 | 2.4 |
| Fecal coliforms (bact./100 mL) | 0.3 | 758000 | 0 |
| | 0.6 | 575000 | 1200 |
| | 1.3 | 1819000 | 5500 |

The pH of the effluent ranged from 6.6 to 6.8; the total solids removal averaged more than 98%; $BOD_5$ concentrations were reduced by 92%. Laboratory results from the N analyses showed excellent removal (average 81%); the average reduction of total P was 46%.

Fecal coliforms tests were conducted on the influent and effluent samples. The primary effluent used in the test averaged about 1,050,000 bacteria/ 100 mL as fecal coliforms and reduction exceeded 99% after filtering through the biofiltration system. The counts of fecal coliforms at effluent were no more than 5500/100 mL.

Aerobic conditions were maintained during the entire period of experimentation. The dissolved oxygen concentration of the effluent ranged from 3.5 to 8.1 mg/L. Clogging of calcareous stone on surface of the peat bed occured after 7 days of operation for a hydraulic charge of 0.6 m/day. This problem was solved by washing once a week. No internal clogging of the peat-bed was encountered over a period of use of approximately one year.

The yellow color conferred to water by peat decreases gradually with time. After 10 weeks of continuous operation the yellow color conferred to water by peat was low so the color of the effluent became similar to the influent.

EXAMPLE 2

According to a second aspect of the invention, one column identical to the ones described in example 1 was used in a domestic application. In such a system, the biofilter was fed with intermittent high hydraulic charges varying with the intensity of use of the inhabitant of the house. The flow rate was controlled by an adaptation of the influent means to respect a maximum of hydraulic charges of 1.3 m/day.

Table 2 summarizes the results obtained with such a biofilter which was in operation for 6 months with sampling approximately 2 times/week.

TABLE 2

| Parameters | Affluent | Effluent | % reduction |
| --- | --- | --- | --- |
| Temperature (C.) | 10 | 9 | — |
| pH | 7.9 | 6.8 | — |
| Color (ucv) | *** | 392 | — |
| Turbidity (NTU) | 57 | 3 | 96 |

TABLE 2-continued

| Parameters | Affluent | Effluent | % reduction |
| --- | --- | --- | --- |
| Dissolved oxygen | 1.3 | 4.4 | — |
| Alcalinity (mg $CaCO_3$/L) | 301 | 178 | — |
| MES | 49 | 2 | 95 |
| MVES | 45 | 2 | 96 |
| total $BOD_5$ | 188 | 6 | 97 |
| total COD | 430 | 120 | 72 |
| NTK | 73 | 35 | 52 |
| $NH_4+$ | 42 | 29 | 31 |
| NOx | 0 | 16 | — |
| total Poly-orthophosphates | 2.2 | 0.6 | 73 |
| total phosphorus | 10.0 | 8.6 | 14 |
| fecal coliforms (bact./100 mL) | 189000 | 137 | >99 |

Table 3 is a comparative table showing the efficiency of these systems (from example 1 and 2) for the elimination of total phosphorus. As is indicated from this table, the hydraulic charges that may be withstood by our system is 3 to 40×higher than what is described for conventional systems.

The overall efficiency of the system is comparable to all of the ones presented in table 3, but the hydraulic charge is higher than the other references presented. However, the elimination of phosphorus was not efficient. A way to overcome this problem is described at example 3.

TABLE 3

| | Hydr.ch m/day | S | $BOD_5$ | N | P | coliforms |
| --- | --- | --- | --- | --- | --- | --- |
| Farnham and Brown (1972) | 0.1–0.2 | 9 | >98 | — | >92 | 100 |
| Nichols and Boelter (1982) | — | 317 | — | 90 | >99 | >99 |
| Brooks et al. (1984) | 0.015 –0.04 | 91–30 | — | >90 | >60 | >90 |
| Buelna and Bélanger (1989) (from example 1) | 0.6 | 0.6 | 98 | 75 | 32 | >99 |
| Buelna and Bélanger (1990) (from example 2) | <1.3 | 4.5 | 97 | 52 | 14 | >99 |

S: surface of the filter bed.

EXAMPLE 3

Following the use of these biofilters, it can be seen that the elimination of phosphorus may be improved while conserving the efficiency with high hydraulic charges. Also, the elimination of the color of the effluent water (caused by high concentrations of humic acids) would be highly desirable in these systems. One way to overcome these problems has been to treat the peat chemically in order to increase its efficiency in removing phosphorus and color.

According to a third aspect of the present invention, after the pre-sieving step, removal of the phosphorus and elimination of color leaching is achieved by mixing the obtained intermediary fibers with $CaCO_3$ and Fe-containing compound, or equivalents thereof, in predetermined concentrations. Firstly, the $CaCO_3$ is mixed with the pre-seeved peat in a proportion of 15% v/v. This may be done in any kind of rotatary mixer or homogenizer. It will be understood that the volume of the peat is measured after pre-sieving at its natural humidity level. Also, any equivalent of $CaCO_3$ may be used such as for example $Ca(OH)_2$.

After homogenization, the peat-mixture is mixed with powdered iron-containing compound, preferably $FeCl_3$, in proportions from 5% to 15% dry weight. The peat weight is determined after pre-sieving. As a preferred ratio, the iron is added in a 5% proportion. Also, Aluminum-containing compound may be used instead of Fe but is not recommended since adverse effects may follow if any Al leaches out of the biofilter.

There is to be noted that the addition of lime alone or of iron-containing compound alone does not give an efficient removal of phosphorus. The specific mechanism involved here has not yet been defined but it is believed that neutralization of the peat's naturally acidic pH does enhance flocculation and precipitation of iron-containing salts. The precipitates in turn retain phosphorus, and humic acids that give rise to the color of the effluent water.

Such a mixture of peat may be used for any type of biofilter such as the ones used in examples 1 and 2. These biofilters may withstand high hydraulic charges and does not give rise to any leaching color problems or internal clogging problems. In addition the elimination of phosphorus is maximal and there is no color found in the effluent water, and this from day 1 of treatment.

Table 4 shows the removal efficiency of color and phosphorus of a biofilter having the same particulars as the one used in example 1 but filled with the mixture of pre-sieved peat, lime, and iron-containing compound.

TABLE 4

| Parameters | Affluent | Effluent |
| --- | --- | --- |
| pH | 7.1 | 8.0 |
| Color (uvc) | 56 | 15 |
| total orthophosphates (mg P/L) | 3.3 | <0.1 |
| total phosphorus (mg P/L) | 3.6 | <0.1 | hydraulic charge of: 0.71 m/day

We claim:

1. A method for pretreating peat to be used in a peat-based biofilter for wastewater treatment, said peat originally containing large, intermediate and small fibers, said method comprising:
   a) sieving said peat through a first grid of approximately ¾th of an inch diameter in order to eliminate the large fibers thereof and then through a second grid of approximately 3/16th of an inch in diameter in order to eliminate the small fibers while retaining and recovering the intermediary fibers of said peat,
   b) mixing the intermediate fibers retained by said second grid with a Fe-containing compound or equivalents thereof, and $CaCO^3$ or equivalents thereof.

2. A method of pre-treating peat according to claim 1, wherein said peat has a Von Post index ranging from approximately 3 to 6.

3. A method for pre-treating peat according to claim 1, wherein said peat has an apparent density ranging from approximately 0.06 to 0/08 $g/cm^3$.

4. A method for pre-treating peat according to claim 1, wherein said $CaCO_3$ or equivalent thereof is at a concentration of approximately 15% v/v of wet pre-seeved peat.

5. A method of pre-treating peat according to claim 1, wherein said Fe-containing compound or equivalents thereof is $FeCl_3$ at a concentration ranging from approximately 5% to 15% w/w of dry pre-seeved peat.

6. A mixture of peat for use in a biofilter for wastewater treatment, said mixture comprising:
   a) peat originally containing large, intermediate and small fibers, said peat having been pre-sieved through a first grid having approximately 3/4th of an inch in diameter and through a second grid having 3/16th of an inch in diameter to recover only said intermediary fibers; and
   b) $CaCO_3$ or equivalent thereof, and
   c) a Fe-containing compound or equivalents thereof.

7. A mixture for use in a biofilter for wastewater treatment said mixture comprising:
   a) peat having a Von Post index ranging approximately between 3 to 6, said peat originally containing large, intermediate and small fibers and having been pre-sieved through a first grid having approximately ¾th of an inch in diameter, and through a second grid having 3/16th of an inch in diameter in order to recover only said intermediate fibers;
   b) $CaCO_3$ or equivalent thereof present at a concentration of approximately 15% v/v of wet pre-sieved peat; and
   c) $FeCl_3$ at a concentration of approximately from 5 to 15% of dry pre-sieved peat.

8. A peat-based biofilter comprising said mixture of peat according to claim 6.

9. A peat-based biofilter comprising said mixture of peat according to claim 7.

10. A method of pre-treating peat for use in a biofilter for wastewater treatment wherein said peat is successively pre-sieved through first and second sieving means having a diameter ranging between approximately ¾th and 3/16th of an inch, respectively in order to recover only intermediary fibers having passed through the first sieving means but not through the second sieving means whereby, when said peat is packed in said biofilter, said biofilter thereby avoiding internal clogging problems.

11. A method of pre-treating peat for use in a biofilter for wastewater treatment, wherein said peat is mixed with $CaCO_3$ or equivalents thereof at a concentration of approximately 15% v/v of wet peat, and with $FeCl_3$ at a concentration ranging from approximately 5% to 15% w/w of dry peat.

12. A method according to claim 11, wherein said $CaCO_3$ or equivalent thereof is mixed at a concentration of approximately 15% v/v of wet pre-seeved peat.

13. A method according to claim 11, wherein said Fe-containing compound or equivalent thereof is $FeCl_3$ at concentrations ranging from approximately 5% to 15% w/w of dry pre-seeved peat.

14. A mixture of peat for use in a biofilter for wastewater treatment, said mixture comprising peat originally containing large, intermediate and small fibers, said peat having been pre-sieved through a first grid being approximately ¾th of an inch in diameter and through a second grid being 3/16th of an inch in diameter to recover only said intermediary fibers.

15. A peat-based biofilter comprising said mixture of peat of claim 14.

16. A mixture of peat for use in a biofilter for wastewater treatment, said mixture comprising peat in admixture with $CaCO_3$ or equivalents thereof at a concentration of approximately 15% v/v of wet peat and with $FeCl_3$ at a concentration ranging from approximately 5 to 15% w/w of dry peat.

17. A peat-based biofilter comprising said mixture of peat of claim 16.

* * * * *